United States Patent [19]

Bauer et al.

[11] 4,278,430
[45] Jul. 14, 1981

[54] SIGNAL SIMULATOR

[75] Inventors: Siegfried Bauer, Heidelberg; Dieter Burckhart, Wiesloch, both of Fed. Rep. of Germany

[73] Assignee: Eltro GmbH Gesellschaft Fur Strahlungstechnik, Heidelberg, Fed. Rep. of Germany

[21] Appl. No.: 818,991

[22] Filed: Jul. 13, 1977

[51] Int. Cl.³ .............................................. G09B 9/00
[52] U.S. Cl. ...................................... 434/2; 343/17.7
[58] Field of Search ...................... 343/17.7; 35/10.4

[56] References Cited

U.S. PATENT DOCUMENTS

| 2,836,904 | 6/1958 | Hickey | 35/10.4 |
| 3,365,719 | 1/1968 | Williams | 35/10.4 X |
| 3,832,712 | 8/1974 | Goetz et al. | 343/17.7 |
| 4,005,424 | 1/1977 | Fetter | 343/17.7 |
| 4,163,234 | 7/1979 | Beno et al. | 343/17.7 |

Primary Examiner—T. H. Tubbesing
Attorney, Agent, or Firm—Haseltine and Lake

[57] ABSTRACT

A simulator for simulation of signals of a target radiator includes a first free-running frequency generator operating at a first frequency for simulating the intensity fluctuations of a target radiator, an amplitude regulator connected to the free-running generator for controlling the amplitude of the first frequency, a second free-running generator operating at a second frequency lower than the first frequency for simulating the amplitude and phase of a vectoril target representation, and a frequency divider chain for coupling the first generator to the second generator.

12 Claims, 1 Drawing Figure

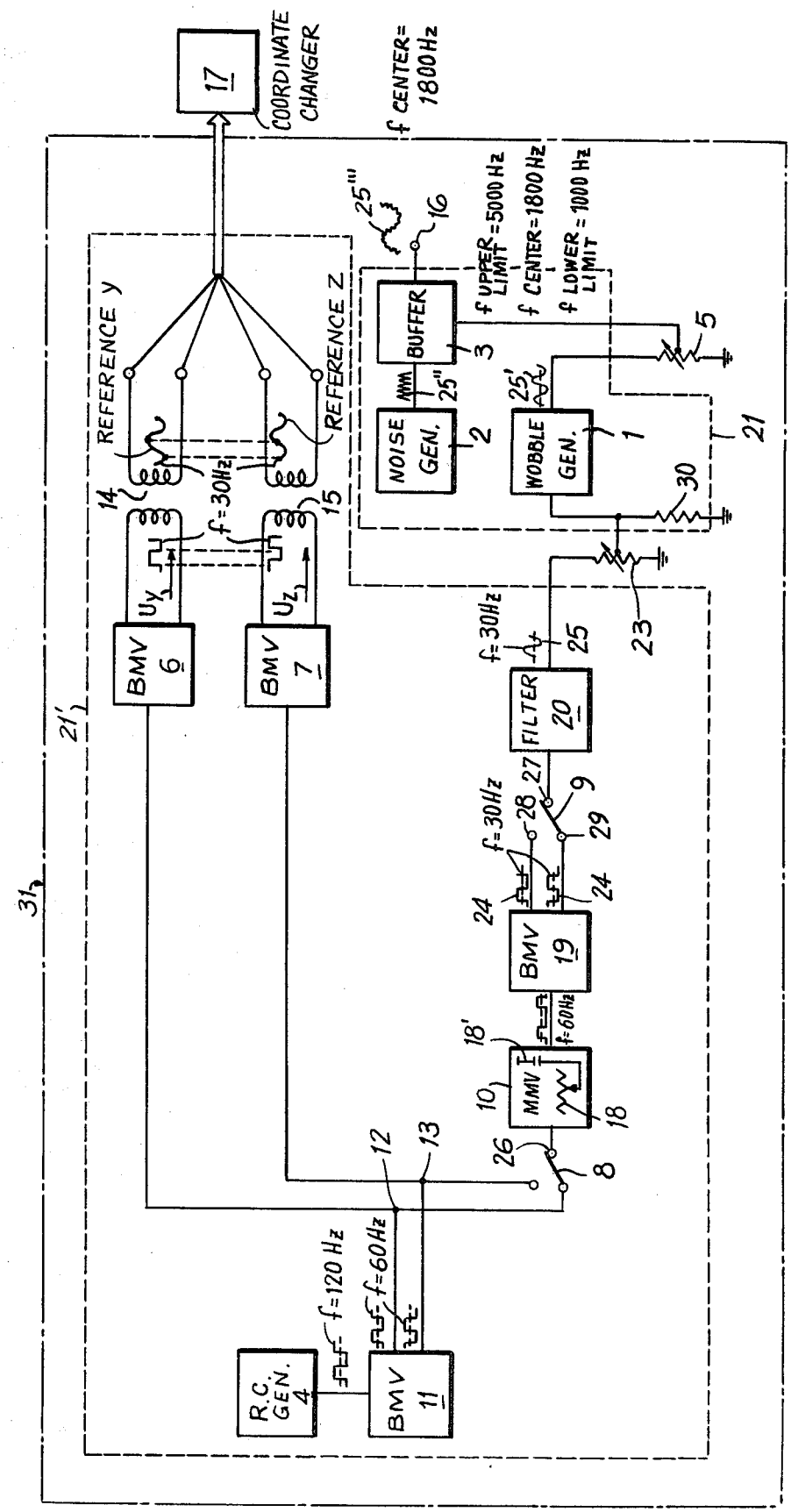

SIGNAL SIMULATOR

FIELD OF THE INVENTION

The present invention relates to a simulator for simulation of signals which are fed from a directional radiator via a frequency modulator to the detector of a goniometer, and which consists substantially of generators, multivibrators, filters, transmission elements as well as control and regulating elements.

SUMMARY OF THE INVENTION

It is an object of the present invention to develop an instrument system, by means of which the functions of goniometers of the initially further illustrated kind can be simulated, the goniometers being primarily used in the Franco-German weapons systems HOT, MILAN and ROLAND. This task is solved, according to the invention, by a free-running generator system frequency simulating the intensity fluctuation of a target radiator being functionally coupled by amplitude regulation to another free-running second generator of a lower frequency via a frequency divider chain, the lower frequency generator simulating the amplitude and phase of vectorial target representation means Each target position within a predetermined image field can thereby be simulated in a consistent functional, and yet in a relatively simple manner.

In an advantageous further development of the invention the generator system consists of a wobble generator transmitting sinusoidally formed signals, and a noise generator super-imposing a predetermined noise amplitude on the signal, and the second generator consists of a reference generator transmitting signals having a wobble frequency for the wobble generator, and synchronous reference signals for a coordinate-changer. The synchronous simulation of the wobble- and reference signals is required, since the goniometer to be simulated, or its reference take-off means is mechanically coupled in a rigid manner with the frequency modulation of the modulator.

With reference to the individually selected modular blocks it is advantageous if the portion of the frequency divider chain interconnected between the wobble generator and the reference generator consists, as sequentially seen in the direction of operation, of a bistable multivibrator, a switch permitting a 90° phase switching, a monostable multivibrator, a further bistable multivibrator, a positive-to-negative switch (a switch permitting 180° phase reversal), and an active filter, as well as a potentiometer. While each bistable multivibrator serves for frequency division, the monostable multivibrator for a continuous phase change by 150°, the active filter for a transformation of rectangular signals into sinusoidal signals, and the potentiometer for control of the wobble amplitude, the two switches provided within the frequency divider chain permit a 90° phase switch (Y-Z) and a 180° waveform shift, respectively i.e., a switch from a positive to a negative polarity.

In connection with the above it is further advantageous if the bistable multivibrator connected to the reference generator controls via its two outputs, as seen in the sequence of operation, two channels associated with the aforesaid output, respectively, and a coordinate changer, the coordinate changer being connected via a plug, and the two channels consisting of bistable multivibrators and transformers, respectively.

As far as the two switches are concerned, the input of the monostable multivibrator may be connected by means of one of the switches at a time to one of the respective outputs of the bistable multivibrator, while the input of the active filter is connected at a time to one of the two outputs of the other bistable multivibrator.

In another advantageous embodiment of the invention the wobble generator and the noise generator are connected at their respective outputs via a joint decoupling stage to the plug, and a potentiometer is connected between the wobble generator and the decoupling stage. All potentiometers are, however, advantageously formed as ten-turn rotating potentiometers, and are mounted on a common mounting plate, it being advantageous from a construction point of view if one potentiometer turn corresponds to an integral angle measured in radians.

According to further features of the invention the wobble generator, noise generator and decoupling stage on the one hand, as well as the reference generator, filter and all multivibrators on the other hand, are disposed on respective printed circuit cards. Looked at as a whole it is then advantageous if all the generators, the decoupling stage with the associated potentiometers as well as the frequency divider chain form a complete modular unit.

BRIEF DESCRIPTION OF THE DRAWINGS

An implementation example of the present invention is further illustrated by means of a block circuit diagram being the sole FIGURE of the drawing.

DESCRIPTION OF THE PREFERRED EMBODIMENTS

A goniometer, not the subject of the present application, is described, for example, in U.S. Pat. No. 2,967,247. It serves for the semi-automatic guidance of an airborne body and is a direction-finding system disposed on the ground, the airborne body being in this case a rocket. The goniometer determines the direction of infrared-radiation generated from a radiation source disposed on the rear of the rocket and supplies two voltages from an electronic circuit defining the position of the rocket in cartesian coordinates. Since training involving a weapon system of this kind is too costly, a simulator is needed for training operating personnel, as well as for supervising individual functions of such a weapon system; the simulator simulates conditions prevailing when a weapon system of this type is being used.

A simulator 31, according to the present invention, includes an RC-generator 4, which acts as a reference signal-source for simulating angular deviation from the target in polar coordinates. The output of the RC-generator 4 is a square wave, the square wave feeding the input of a bistable multivibrator 11, the latter also generating a square wave. For example, the RC-generator may generate a square wave having a frequency of 120 Hz, the multivibrator then generating a frequency of 60 Hz. The RC-generator 4 generates reference signals for a coordinate changer 17, the latter changing polar coordinates generated by the aforesaid goniometer into cartesian coordinates. The coordinate changer is driven by the reference signals y and z. Additionally, the RC-generator 4 also generates a synchronous wobble amplitude for an RC-generator 1, which will be further described below.

In order to simulate every target position within an image angle reachable by the optics of the goniometer, additional switches 8 and 9 are required in addition to a continuous phase change of, for example, 150°, provided with the aid of a monostable multivibrator 10. Upon division of the frequency from 120 Hz to 60 Hz by the divider 11, the monstable multivibrator 10 is driven so that its input 26 may be connected either to the output 12, or to the output 13 of the bistable multi-vibrator 11. The latter outputs rectangular 60 Hz signals inverted, or shifted, by 180° with respect to one another. Depending on the position of switch 8, one of the latter signals is fed to the input of the monostable multivibrator 10, a rectangular-shaped signal of 60 Hz frequency being also available on its output; the duty cycle of the output signal of the multivibrator 10 is, however, variable by a potentiometer 18. The potentiometer 18 is a 10-turn potentiometer and forms an integral part of the multivibrator 10, being a variable resistance for the phase-determining combination of the resistor 18 and the capacitor 18'.

The output signal of the multivibrator 10 is fed to the input of a bistable multivibrator 19. Following a further frequency division from 60 Hz to 30 Hz, two rectangular signals shifted from one another by 180° are available on the output of bistable multivibrator 19. The latter multivibrator drives an active filter 20, the input of the latter being connectable to either one of the two outputs 28 or 29 of the bistable multivibrator 19, so that one of the rectangularly-shaped output signals 24 is fed to the input of the active filter 20. The latter transforms the input signal to a sinusoidally shaped wobble signal 25, also having a frequency of 30 Hz, which is fed from the output of the filter 20 to the input of the RC-generator 1. A potentiometer 23 is connected to the output of the filter 20, one terminal of the potentiometer 23 being grounded. The potentiometer 23 determines the amplitude of the output signal of the filter 20 feeding the input of the wobble generator 1, the amplitude of the wobble signal simulating the angular deviation of the target from the optical axis, which is the axis of symmetry of the goniometer optics.

A fixed divider 30 is connected to the center tap, or variable output tap, of the potentiometer 23, one terminal of the latter being connected to the input of the wobble generator 1, its other end being grounded. A potentiometer 5, which may, for example, be a ten-turn potentiometer is connected with one end to the output of the wobble generator 1, its other end being grounded, and its center tap, or variable tap, being connected to a decoupling stage 3, which latter also acts as an output amplifier; the potentiometer 5 typically has a value of 100 kohms. The potentiometer 5 permits the adjustment of predetermined signal amplitudes, and consequently of a predetermined and simulated radiation from the target.

A sinusoidally shaped wobble signal 25' is consequently available from the output of the RC-generator 1, which has, for example, a center frequency of 1800 Hz; its upper frequency $f_u$, is about 5000 Hz, and its lower frequency $f_l$ is about 1000 Hz. This generator is then a signal source for the target to be simulated; it simulates the mechanical motion in terms of a so-called modulation depth of a modulation system. The wobble signal 25' available from the output of the RC-generator 1 is fed to one of the two inputs of the decoupling stage 3. The other input of the decoupling stage 3 is connected to the output of a noise generator 2, which superimposes a predetermined noise amplitude 25" on the signal 25', so that there is available at the output of the decoupling stage or buffer 3, a signal 25''', having a center frequency $f_c$ of about 1800 Hz, and being a sinusoidal signal having a noise waveform superimposed thereon; that signal is available on an output plug 16.

The previously described reference signals, being originally generated by the RC-generator 4, and reduced by the bistable multivibrator 11 to a frequency of 60 Hz, are fed from the outputs 12 and 13, respectively, of the bistable multivibrator 11 to respective inputs of bistable multivibrators 6 and 7, which act as dividers. These multivibrators divide the frequency, so that there are available on the outputs of the bistable multivibrators 6 and 7, or on the primary sides of respective transformers 14 and 15, two rectangularly shaped signals $U_y$ and $U_z$, phase shifted by 180°. Each of the rectangular signals has a frequency of 30 Hz. On the secondary windings of the transformers 14 and 15 there are then also available approximately sinusoidally-shaped signals displaced with respect to one another by 180°, the transformers 14 and 15 also acting as filters. The RC-generator 1, the noise generator 2 and the decoupling stage 3 are layed out on a printed circuit card 21, whereas the RC-generator 4, the multivibrator 11 as well as elements 6–10, 14, 15, 19 and 20 are layed out on printed card 21'.

The embodiment example shown is formed as a single compact unit 31 within the dotted outline shown on the drawing. It is equally possible to arrange the component parts of the simulator into a plurality of modular groups. The invention is not limited to the frequencies and degrees indicated; it is perfectly conceivable that, if necessary, appropriate modular units are designed for other values, without in any way deviating from the scope of the present invention, recited in the appended claims.

What is claimed is:

1. A simulator for simulation of signals of a target radiator comprising:
   first free-running frequency generator means operating at a first frequency for simulating the intensity fluctuations of a target radiator;
   amplitude regulation means connected to said free-running generator means for controlling the amplitude of said first frequency;
   second free-running generator means operating at a second frequency lower than said first frequency for simulating the amplitude and phase of a vectorial target representation means; and
   frequency divider means for coupling said first generator means to said second generator means.

2. A simulator according to claim 1 wherein said first generator means includes a wobble generator for generating sinusoidal signals and a noise generator connected to said wobble generator for superimposing a predetermined noise waveform on said sinusoidal signals, and wherein said second generator means includes a reference generator for generating signals having a wobble frequency for the wobble generator and for generating reference signals for a coordinate changer.

3. A simulator according to claim 2 wherein said frequency divider means is connected to said wobble generator and to said reference generator and includes, as viewed from its input to its output, a first bistable multivibrator, a first switch connected to the output of said first multivibrator for shifting the output thereof by 180°, a monostable multivibrator connected to said switch, a second bistable multivibrator connected to said monostable multivibrator, a one hundred and eighty degree phase reversing switch connected to said second multivibrator, an active filter connected to said phase reversing switch, and a potentiometer connected to said active filter for regulating the output amplitude of the latter.

4. A simulator according to claim 3 further comprising a decoupling stage connected to the outputs of said wobble- and noise generators, and an output plug connected to said decoupling stage.

5. A simulator according to claim 4 wherein said frequency divider means comprises first and second transmission channels, and a first bistable multivibrator having first and second outputs connected to said first and second channels, respectively, for controlling the coordinate changer.

6. A simulator according to claim 5 wherein said channels include third and fourth multivibrators, respectively and first and second transformers connected to said third and fourth multivibrators, respectively.

7. A simulator according to claim 4 wherein said amplitude regulation means comprises a second potentiometer and further comprising a third potentiometer, said second and third potentiometers being connected to said wobble generator and said monostable multivibrator, respectively, for controlling the output amplitude of the wobble generator and the duty cycle of the monostable multivibrator, each of said potentiometers being a ten-turn potentiometer.

8. A simulator according to claim 7 wherein a single turn of each of said potentiometers corresponds to an integral waveform angle measured in radians.

9. A simulator according to claim 7 wherein said third potentiometer is formed as an integral part of said monostable multivibrator.

10. A simulator according to claim 4 further comprising first and second printed circuit cards, said wobble and noise generators and said decoupling stage being mounted on said first card, said filter and said multivibrators being mounted on said second card.

11. A simulator according to claim 3 wherein said monostable multivibrator has an input, and said first bistable multivibrator has first and second outputs, and wherein the monostable multivibrator input is selectively connectable to said first and second outputs of said first multivibrator via said first switch.

12. A simulator according to claim 3 wherein said second bistable multivibrator has first and second outputs and said active filter has an input selectively connectable to the first and second outputs of said second multivibrator via said one hundred and eighty degree phase-reversing switch.

* * * * *